United States Patent
Hu et al.

(10) Patent No.: US 10,686,728 B2
(45) Date of Patent: Jun. 16, 2020

(54) SYSTEMS AND METHODS FOR ALLOCATING COMPUTING RESOURCES IN DISTRIBUTED COMPUTING

(71) Applicant: Huawei Technologies Co., Ltd., Shenzhen (CN)

(72) Inventors: Zhenhua Hu, Toronto (CA); Xiaodi Ke, Markham (CA); Khaled Ziya Aeen, Toronto (CA); Zhi Zhao, North York (CA); Zhigang Luo, Vaughan (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 15/643,429

(22) Filed: Jul. 6, 2017

(65) Prior Publication Data

US 2019/0014059 A1    Jan. 10, 2019

(51) Int. Cl.
*H04L 12/911* (2013.01)
*H04L 29/08* (2006.01)
*G06F 9/50* (2006.01)

(52) U.S. Cl.
CPC ......... *H04L 47/827* (2013.01); *G06F 9/5083* (2013.01); *H04L 67/10* (2013.01)

(58) Field of Classification Search
CPC ........ H04L 47/872; H04L 67/10; G06F 9/445
See application file for complete search history.

(56) References Cited

U.S. PATENT DOCUMENTS

| | | | |
|---|---|---|---|
| 2011/0185364 A1 | 7/2011 | Fernandes et al. | |
| 2012/0054763 A1* | 3/2012 | Srinivasan | G06F 9/5005 718/104 |
| 2014/0173620 A1 | 6/2014 | Chai et al. | |
| 2016/0014039 A1* | 1/2016 | Reddy | H04L 67/38 709/224 |

(Continued)

FOREIGN PATENT DOCUMENTS

| | | |
|---|---|---|
| CN | 102088719 A | 6/2011 |
| CN | 102193833 A | 9/2011 |

(Continued)

OTHER PUBLICATIONS

Schwarzkopf M. et al., Omega: flexible, scalable schedulers for large compute clusters, EuroSys'13, Apr. 15-17, 2013, pp. 351-364, Prague, Czech Republic.

(Continued)

*Primary Examiner* — Angela Nguyen
(74) *Attorney, Agent, or Firm* — Slater Matsil, LLP

(57) ABSTRACT

Systems and methods are disclosed herein for allocating computing resources for execution of workloads in a distributed computing system with resource acquisition cycles and workload scheduling cycles. One or more resource offer managers transmit resource offers to each of one or more of schedulers. Each scheduler transmits a resource request and/or resource release request in response to each resource offer manager. Each resource offer manager computes a resource allocation for each scheduler after resolving conflicts and assigns the resources to each scheduler according to the resource allocation decisions. The resource acquisition cycle and the workload scheduling cycle are decoupled.

25 Claims, 7 Drawing Sheets

(56) References Cited

U.S. PATENT DOCUMENTS

| | | | |
|---|---|---|---|
| 2016/0154677 A1* | 6/2016 | Barik | G06F 13/4239 |
| | | | 718/105 |
| 2016/0283270 A1 | 9/2016 | Amaral et al. | |
| 2017/0277569 A1* | 9/2017 | Jurgens | G06F 9/5033 |
| 2017/0289061 A1* | 10/2017 | Cudak | H04L 41/0896 |
| 2018/0302299 A1* | 10/2018 | Sun | H04L 41/5019 |
| 2018/0316752 A1* | 11/2018 | Hodges | H04L 67/1023 |

FOREIGN PATENT DOCUMENTS

| | | |
|---|---|---|
| CN | 102546379 A | 7/2012 |
| CN | 102958166 A | 3/2013 |
| CN | 103699445 A | 4/2014 |
| CN | 106020941 A | 10/2016 |
| CN | 106446959 A | 2/2017 |
| WO | 2012100545 A1 | 8/2012 |

OTHER PUBLICATIONS

[#MESOS-1607] Introduce optimistic offers, https:issues.apache.org/jira/browse/MESOS-1607 retrieved on Nov. 20, 2017.
[#MESOS-4967] Oversubscription for reservation, https://issues.apache.org/jira/browse/MESOS-4967 retrieved on Nov. 20, 2017.

* cited by examiner

SYSTEMS AND METHODS FOR ALLOCATING COMPUTING RESOURCES IN DISTRIBUTED COMPUTING

FIELD

The present disclosure relates to distributed computing systems, and in particular, to systems and methods for managing the allocation of computing resources to schedulers in distributed computing systems.

BACKGROUND

In modern distributed computing systems, such as cloud computing systems, many different computing tasks (referred to as workloads hereinafter) are aggregated from multiple sources (e.g. tenants, projects, groups and workstations) through computing devices. Likewise, computing resources from multiple computing devices or resource servers can be aggregated or pooled for distribution of available computing resources among workloads.

Resource management systems can manage workloads through the use of schedulers. Schedulers receive workloads from computing devices and assign workloads to computing resources on computing devices or resource servers for execution. Scheduling workloads can be challenging, as available computing resources are limited. In some cases, there are more workloads than there are available resources to run these workloads. Some resource management systems include multiple schedulers which are specialized for different types of workloads, responsible for different types of resources, or to represent different tenants. When more than one scheduler is present in a distributed computing system, conflicts may arise when two schedulers attempt to simultaneously use the same computing resource for a workload. Conflicts between the schedulers' demands can be resolved, and can result in inefficient scheduling, because the unsuccessful scheduler will have to spend additional time attempting to find another computing device or resource server with available resources that can perform the workload. Inefficient scheduling can have a negative effect on performance metrics such as workload throughput, resource utilization rates, and workload runtimes.

As the distributed computing system scales and the volume of workloads increases, workload scheduling itself can become a complicated and time-consuming process. Scheduling workloads efficiently can be challenging, particularly when the total workload approaches or exceeds the computing resources available from computing devices or resource servers. Unfortunately, existing approaches to workload scheduling tend to degrade in efficiency and performance as the number of workloads increases, and the resolution of conflicts between schedulers can become a bottleneck for system performance.

SUMMARY

An example method of allocating computing resources for execution of workloads in a distributed computing system comprises: performing a first resource acquisition cycle associated with a first resource offer manager, the first resource acquisition cycle comprising: transmitting, by the first resource offer manager, a first resource offer to each of one or more schedulers, the resource offer specifying a state of each of a first plurality of computing resources; receiving a respective resource request from at least one of the schedulers, the respective resource request based on the state of each of the first plurality of computing resources; computing, by the first resource offer manager, a resource allocation for the one or more schedulers based on the respective resource request; and assigning resources from the first plurality of computing resources to the one or more schedulers according to the respective resource allocation.

In any of the preceding embodiments, the method may comprise performing a workload scheduling cycle comprising: scheduling a first workload associated with each one of the schedulers for execution using computing resources allocated to the one of the schedulers.

In any of the preceding embodiments, the method may comprise beginning a second workload scheduling cycle during the first resource acquisition cycle.

In any of the preceding embodiments, the method may comprise performing a second resource acquisition cycle associated with a second resource offer manager, the second resource acquisition cycle comprising: transmitting, by the second resource offer manager, a second resource offer to each of the one or more schedulers, the second resource offer specifying a state of each of a second plurality of computing resources distinct from the first plurality of computing resources, receiving a resource request based on the state of each of the second plurality of computing resources from at least one of the one or more schedulers, and assigning resources from the second plurality of computing resources to any of the one or more schedulers.

In any of the preceding embodiments, the first resource acquisition cycle and the second resource acquisition cycle may be synchronized.

In any of the preceding embodiments, the at least one of the respective resource requests may comprise a request to acquire a quantity of resources from the first plurality of computing resources, the quantity of resources being specified as a range.

In any of the preceding embodiments, the respective resource request may specify a required affinity.

In any of the preceding embodiments the respective resource request may specify a required anti-affinity.

In any of the preceding embodiments, the state of each of the first plurality of resources may include at least one of an identification of resources currently in use among the first plurality of computing resources, an identification of resources currently free for use among the first plurality of computing resources, an ownership status associated with a particular resource in the first plurality of computing resources, and resource sharing policies between at least two of the schedulers.

In any of the preceding embodiments, the first resource offer may be based on one or more subscriptions associated with one of the schedulers.

In any of the preceding embodiments, the method may comprise: receiving a supplementary resource request from one of the schedulers; and assigning additional resources from the first plurality of computing resources to the one of the schedulers based on the supplementary resource request.

In any of the preceding embodiments, assigning the additional resources from the first plurality of computing resources may comprise: releasing, from a scheduler other than the scheduler sending the supplementary resource request, at least one previously acquired resource to the first plurality of computing resources based on the supplementary resource request; and assigning the released at least one previously acquired resource to the scheduler sending the supplementary resource request.

In any of the preceding embodiments, the method may comprise: performing a workload scheduling cycle by one of the schedulers to schedule a first workload associated with the scheduler for execution using computing resources allocated to the scheduler in parallel with and independently of other schedulers.

In any of the preceding embodiments, the method may comprise: pre-empting resources by a resource offer manager from at least one scheduler and allocating the pre-empted resources to at least one other scheduler based on at least one resource sharing policy.

An example system comprises: at least one processor; a memory containing computer-readable instructions that, when executed by said at least one processor, cause the at least one processor to perform a method comprising: performing a first resource acquisition cycle associated with a first resource offer manager, the first resource acquisition cycle comprising: transmitting a first resource offer to each of one or more schedulers, the resource offer specifying a state of each of a first plurality of computing resources; in response to receiving a respective resource request from at least one of the schedulers, the respective resource request based on the state of each of the first plurality of computing resources, computing a resource allocation for the one or more schedulers based on the respective resource request; and assigning resources from the first plurality of computing resources to the one or more schedulers according to the respective resource allocation.

In any of the preceding embodiments, the method may comprise: performing a workload scheduling cycle comprising: scheduling a first workload associated with one of the schedulers for execution using computing resources allocated to the one of the schedulers.

In any of the preceding embodiments, the method may comprise beginning a second workload scheduling cycle during the first resource acquisition cycle.

In any of the preceding embodiments, the method may comprise: performing a second resource acquisition cycle associated with a second resource offer manager, the second resource acquisition cycle comprising: transmitting, by the second resource offer manager, a second resource offer to each of the one or more schedulers, the second resource offer specifying a state of each of a second plurality of computing resources distinct from the first plurality of computing resources, receiving a resource request based on the state of each of the second plurality of computing resources from at least one of the one or more schedulers, and assigning resources from the second plurality of computing resources to any of the one or more schedulers.

In any of the preceding embodiments, the first resource acquisition cycle and the second resource acquisition cycle may be synchronized.

In any of the preceding embodiments, at least one of the respective resource requests may comprise a request to acquire a quantity of resources from the first plurality of computing resources, the quantity of resources being specified as a range.

In any of the preceding embodiments, the respective resource request may specify a required affinity.

In any of the preceding embodiments, the respective resource request may specify a required anti-affinity.

In any of the preceding embodiments, the state of each of the first plurality of resources may include at least one of an identification of resources currently in use among the first plurality of computing resources, an identification of resources currently free for use among the first plurality of computing resources, an ownership status associated with a particular resource in the plurality of computing resources, and resource sharing policies between at least two of the schedulers.

In any of the preceding embodiments, the first resource offer may be based on one or more subscriptions associated with one of the schedulers.

In any of the preceding embodiments the method may further comprise: receiving a supplementary resource request from one of the schedulers; and assigning additional resources from the first plurality of computing resources to the one of the schedulers based on the supplementary resource request.

In any of the preceding embodiments, assigning the additional resources from the first plurality of computing resources may comprise: releasing, from a scheduler other than the scheduler sending the supplementary resource request, at least one previously acquired resource to the first plurality of computing resources based on the supplementary resource request; and assigning the released at least one previously acquired resource to the scheduler sending the supplementary resource request.

An example computer-readable storage medium has stored thereon computer-executable instructions that, when executed by one or more processors, cause the one or more processors to perform a method of allocating computing resources for execution of workloads in a distributed computing system, the method comprising: performing a first resource acquisition cycle associated with a first resource offer manager, the first resource acquisition cycle comprising: transmitting a resource offer to each of one or more schedulers, the resource offer specifying a state of each of a first plurality of computing resources; in response to receiving a respective resource request from at least one of the schedulers, the respective resource request based on the state of each of the first plurality of computing resources, computing, a resource allocation for the one or more schedulers based on the respective resource request; and assigning resources from the first plurality of computing resources to the one or more schedulers according to the respective resource allocation.

These drawings depict aspects of example embodiments for illustrative purposes.

DETAILED DESCRIPTION

Figure 1:
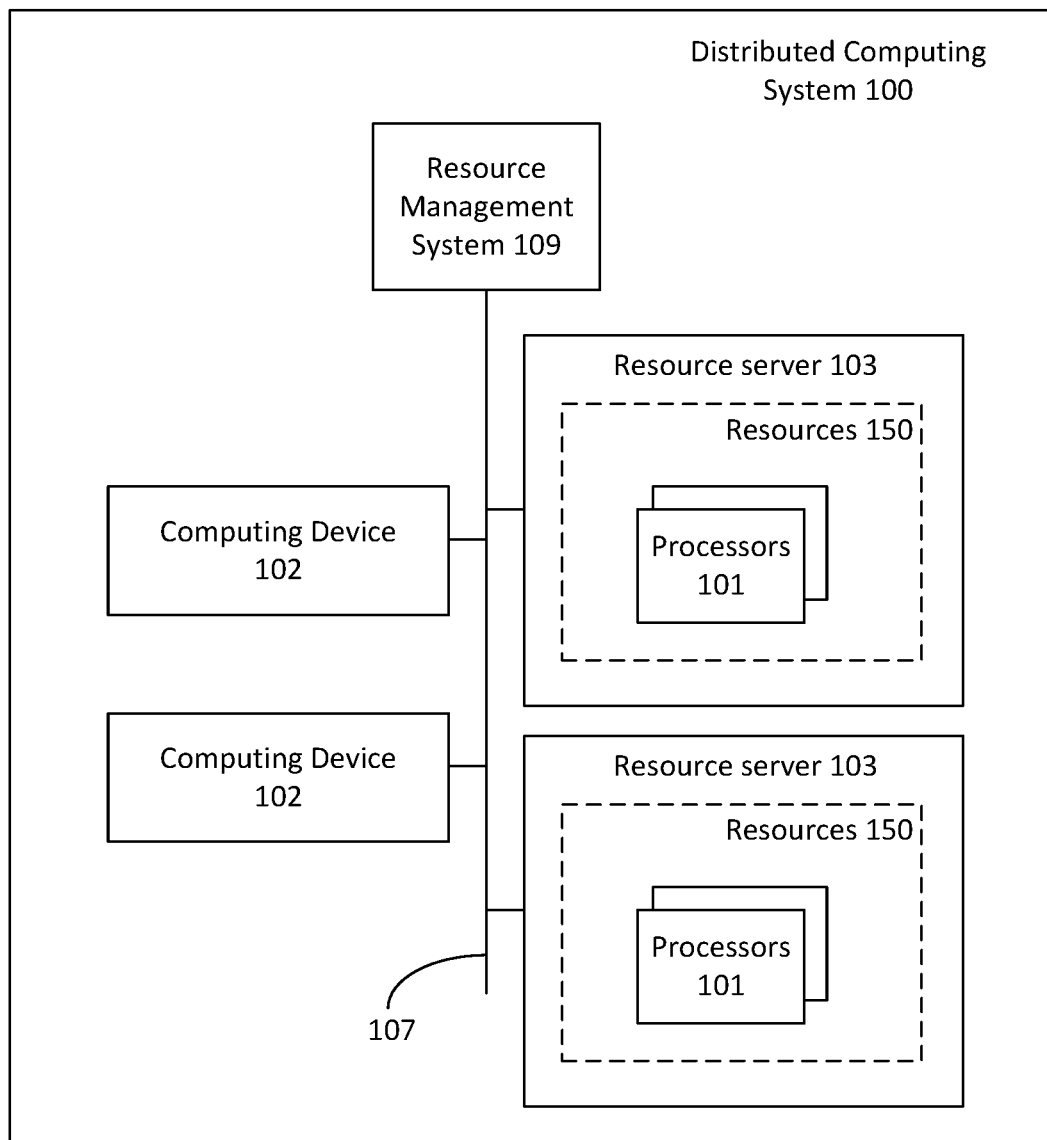
FIG. 1 is a block diagram of an example distributed computing system.

FIG. 1 is a diagram illustrating an example distributed computing system 100. In the distributed computing system 100, one or more computing devices 102 can connect directly or indirectly to one or more resource servers 103 to access or otherwise utilize one or more resources 150 made available by resource servers 103.

The distributed computing system 100 includes hardware and software components. For example, as depicted, distributed computing system 100 includes a combination of computing devices 102, resource servers 103, and a resource management system 109 connected via network 107. As depicted, resource servers 103 have one or more resources 150 which can be allocated to perform computing workloads from the one or more computing devices 102. Resource servers 103 provide, for example, memory (e.g. Random Access Memory (RAM)), processing units such as processors or processor cores, graphics processing units (GPUs), storage devices, communication interfaces, and the like, individually and collectively referred to herein as resources 150.

Resource management system 109 is operable to coordinate the allocation of resources 150 on resource server 103 for the execution of workloads generated by the computing devices 102. In some embodiments, resources 150 include resources from computing devices 102 in addition to resources from resource server 103. In some embodiments, resource server 103 generates workloads for execution by computing resources 150. As depicted, resource management system 109 is implemented as a separate hardware device. Resource management system 109 can also be implemented in software, hardware or a combination thereof on one or more of resource servers 103.

The computing devices 102 may include, for example, personal computers, laptop computers, servers, workstations, supercomputers, smart phones, tablet computers, wearable computing devices, and the like. As depicted, the computing devices 102 and resource servers 103 can be interconnected via network 107, for example one or more of a local area network, a wide area network, a wireless network, the Internet, or the like.

The distributed computing system 100 may include one or more processors 101 at one or more resource servers 103. Some resource servers 103 may have multiple processors 101.

In some embodiments, the distributed computing system 100 is heterogeneous. That is, hardware and software components of distributed computing system 100 may differ from one another. For example, some of the computing devices 102 may have different hardware and software configurations. Likewise, some of the resource servers 103 may have different hardware and software configurations. In other embodiments, the distributed computing system 100 is homogeneous. That is, computing devices 102 may have similar hardware and software configurations. Likewise, resource servers 103 have similar hardware and software configurations.

In some embodiments, the distributed computing system 100 may be a single device, physically or logically, such as a single computing device 102 or a single resource server 103 having one or more resources 150. In some embodiments, the distributed computing system 100 may include a plurality of computing devices 102 which are connected in various ways.

Some resources 150 may be physically or logically associated with a single computing device 102 or group of devices, and other resources 150 may be shared resources which may be shared among computing devices 102 and utilized by multiple devices in the distributed computing system 100. That is, some resources 150 can only be assigned to workloads from a subset of computing devices 102, while other resources 150 can be assigned to workloads from any computing device 102. In some embodiments, distributed computing system 100 operates in accordance with sharing policies. Sharing policies are rules which dictate how particular resources are used. For example, resource management system 109 can implement a sharing policy that dictates that workloads from a particular computing device 102 be performed using resources 150 from a particular resource server 103. Sharing policies can be set for a particular type of resource 150 on resource server 103, and can also apply more broadly to all resources on a resource server 103 or apply system-wide. A computing device 102 can also represent a user, a user group or tenant, or a project. Sharing policies can dictate how resources are shared among users, user groups or tenants, or projects.

Resources 150 in the distributed computing system 100 are or can be associated with one or more attributes. These attributes may include, for example, resource type, resource state/status, resource location, resource identifier/name, resource value, resource capacity, resource capabilities, or any other resource information that can be used as criteria for selecting or identifying a resource suitable for being utilized by one or more workloads.

The distributed computing system 100 may be viewed conceptually as a single entity having a diversity of hardware, software and other constituent resources which can be configured to run workloads from the components of distributed computing system 100 itself, as well as from computing devices 102 external to distributed computing system 100.

Various strategies can be used for scheduling workloads on computing resources. According to a first strategy, a single, centralized scheduler, also referred to as a "monolithic scheduler" herein, handles all workload-to-machine scheduling functions. However, the performance of systems using a single scheduler may degrade as computer systems scale. It may also be difficult to implement customized scheduling or sharing policies in single scheduler systems because single scheduler systems can quickly become slow and inefficient.

According to another strategy, scheduling may be done in two levels. That is, a single resource manager may be used which offers all available resources in the cluster from resource servers 103 to multiple independent schedulers, one scheduler at a time. When resources are offered to a scheduler, the scheduler is able to acquire the resources and assign workloads to those acquired resources.

According to another strategy, the resource manager only offers a subset of the available resources in the cluster to one scheduler at a time. Thus, there is no possibility that more than one scheduler can attempt to simultaneously use the same computing machine to perform different workloads. However, such systems effectively lock that particular machine for use by one scheduler, which leads to inefficiencies. Moreover, such systems effectively operate on a first-come, first-served basis, which makes implementing priority or precedence of workload policies difficult. Finally, such systems can effectively starve second or lower priority schedulers, because the first, or highest priority scheduler may use up all resources, and insufficient resources remain for one or more of the other schedulers. One option is to allow a higher priority scheduler to pre-empt a workload from an acquired computing machine, but this option results in further inefficiency because the pre-empted workload would have to be restarted.

According to another strategy, referred to herein as an "optimistic" strategy, the resource manager offers a list of resources to each scheduler, identifying all resources present within a distributed computing system. Thus, resources may be offered simultaneously to more than one scheduler. In the event that more than one scheduler attempts to assign a workload to the same computing machine, the resource manager resolves the conflict and decides which scheduler will be successful in assigning its workload to the computing machine. Conflicts can be resolved, for example, according to a precedence of permissions, priorities and job importance among schedulers, or other policies implemented in the resource manager. However, the result of a conflict is that one of the schedulers will be rejected and will need to make another attempt to assign the rejected workload to another suitable computing machine. Therefore, in this case, one or more schedulers will have wasted both time and resources in performing scheduling work which was ultimately rejected. This is a binary approach, in which a request by a scheduler is either accepted or rejected, with no flexibility. Moreover, this strategy requires that an exact amount of computing machines, with respect to a workload's resource requests, from a particular resource server or computing device be requested by the scheduler. That is, schedulers make requests on a workload-to-machine basis.

In a system using optimistic schedulers, each optimistic scheduler is unaware of the workload requirements and scheduling policies of the other optimistic schedulers. In the absence of full information, there is a tendency among schedulers to inflate the amount of computing resources requested. However, in a binary approach, this can lead to an inflated request being denied when an adequate, more modest resource request may have been acceptable. It would be beneficial to allow for a degree of flexibility in requesting computing machines and resources.

As increasingly sophisticated scheduling policies and scheduling performance metrics are implemented, the decisions made by a resource manager in resolving conflicts become increasingly complex and time-consuming. The process of conflict resolution can become a bottleneck in a large scale system, particularly when the execution of a workload is delayed by multiple rejections of scheduling requests.

Various embodiments described herein may alleviate or eliminate at least some of the above-noted deficiencies associated with the above-noted strategies.

Figure 2A:
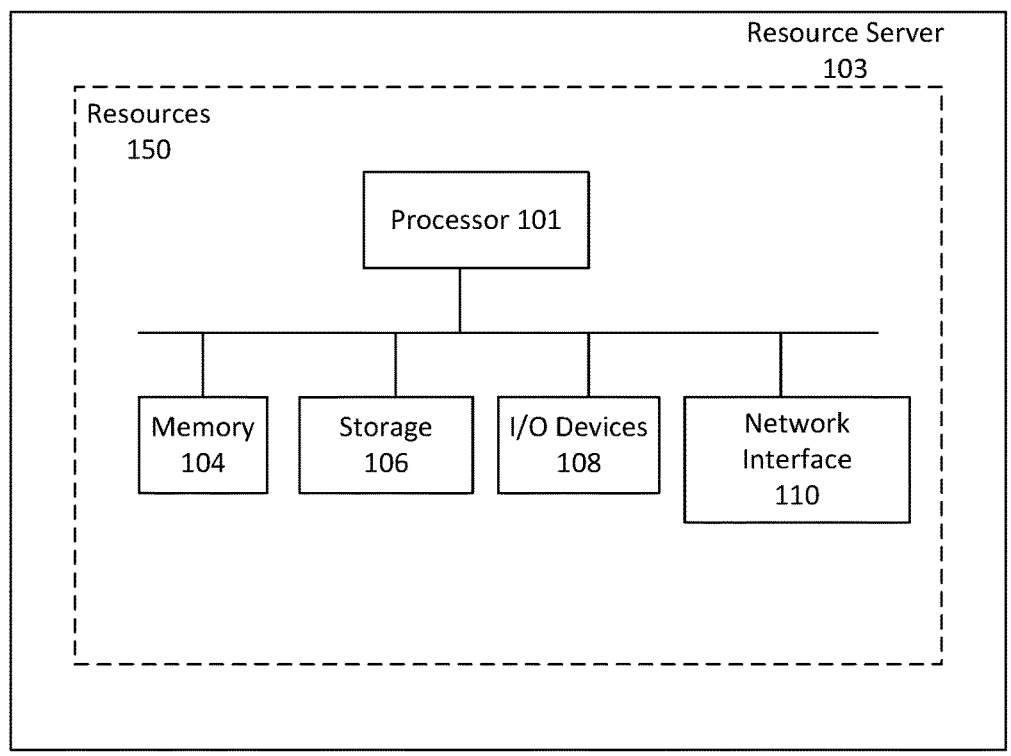
FIG. 2A is a block diagram of an example resource server.

FIG. 2A is a block diagram of an example resource server 103. As depicted, resource server 103 includes one or more processors 101, memory 104, storage 106, I/O devices 108, and network interface 110, and combinations thereof. One or more of the processors 101, memory 104, storage 106, I/O devices 108 and network interface 110 in resource server 103 are used as resources 150 for executing workloads from computing device 102 in distributed computing system 100.

Processor 101 is any suitable type of processor, such as a processor implementing an ARM or x86 instruction set. In some embodiments, processor 101 is a graphics processing unit (GPU). Memory 104 is any suitable type of random-access memory accessible by processor 101. Storage 106 may be, for example, one or more modules of memory, hard drives, or other persistent computer storage devices.

I/O devices 108 include, for example, user interface devices such as a screen, including capacitive or other touch-sensitive screens capable of displaying rendered images as output and receiving input in the form of touches. In some embodiments, I/O devices 108 additionally or alternatively include one or more of speakers, microphones, sensors such as accelerometers and global positioning system (GPS) receivers, keypads or the like. In some embodiments, I/O devices 108 include ports for connecting computing device 102 to other computing devices. In an example, I/O devices 128 include a universal serial bus (USB) controller for connection to peripherals or to host computing devices.

Network interface 110 is capable of connecting computing device 102 to one or more communication networks. In some embodiments, network interface 110 includes one or more of wired interfaces (e.g. wired ethernet) and wireless radios, such as WiFi or cellular (e.g. GPRS, GSM, EDGE, CDMA, LTE, or the like).

Resource server 103 operates under control of software programs. Computer-readable instructions are stored in storage 106, and executed by processor 101 in memory 104.

Figure 2B:
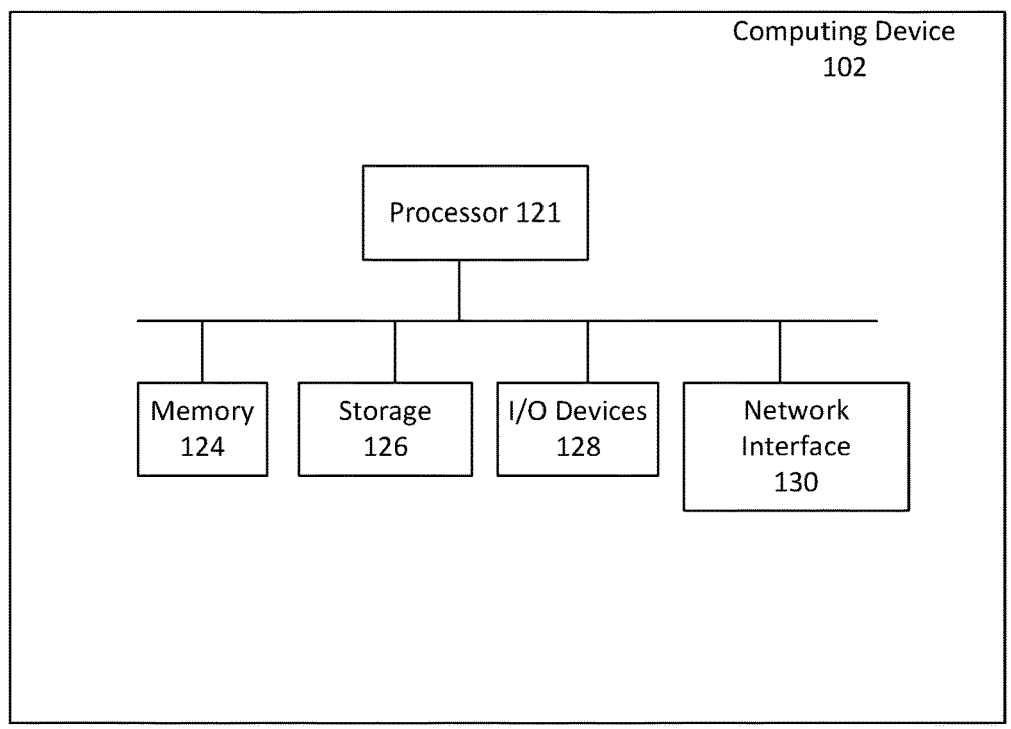
FIG. 2B is a block diagram of an example computing device.

FIG. 2B is a block diagram of an example computing device 102. Computing device 102 may include one or more processors 121, memory 124, storage 126, one or more input/output (I/O) devices 128, and network interface 130, and combinations thereof.

Processor 121 is any suitable type of processor, such as a processor implementing an ARM or x86 instruction set. In some embodiments, processor 121 is a graphics processing unit (GPU). Memory 124 is any suitable type of random-access memory accessible by processor 121. Storage 126 may be, for example, one or more modules of memory, hard drives, or other persistent computer storage devices.

I/O devices 128 include, for example, user interface devices such as a screen, including capacitive or other touch-sensitive screens capable of displaying rendered images as output and receiving input in the form of touches. In some embodiments, I/O devices 128 additionally or alternatively include one or more of speakers, microphones, sensors such as accelerometers and global positioning system (GPS) receivers, keypads or the like. In some embodiments, I/O devices 128 include ports for connecting computing device 102 to other computing devices. In an example, I/O devices 128 include a universal serial bus (USB) controller for connection to peripherals or to host computing devices.

Network interface 130 is capable of connecting computing device 102 to one or more communication networks. In some embodiments, network interface 130 includes one or more of wired interfaces (e.g. wired ethernet) and wireless radios, such as WiFi or cellular (e.g. GPRS, GSM, EDGE, CDMA, LTE, or the like).

Computing device 102 operates under control of software programs. Computer-readable instructions are stored in storage 126, and executed by processor 121 in memory 124.

Figure 3:
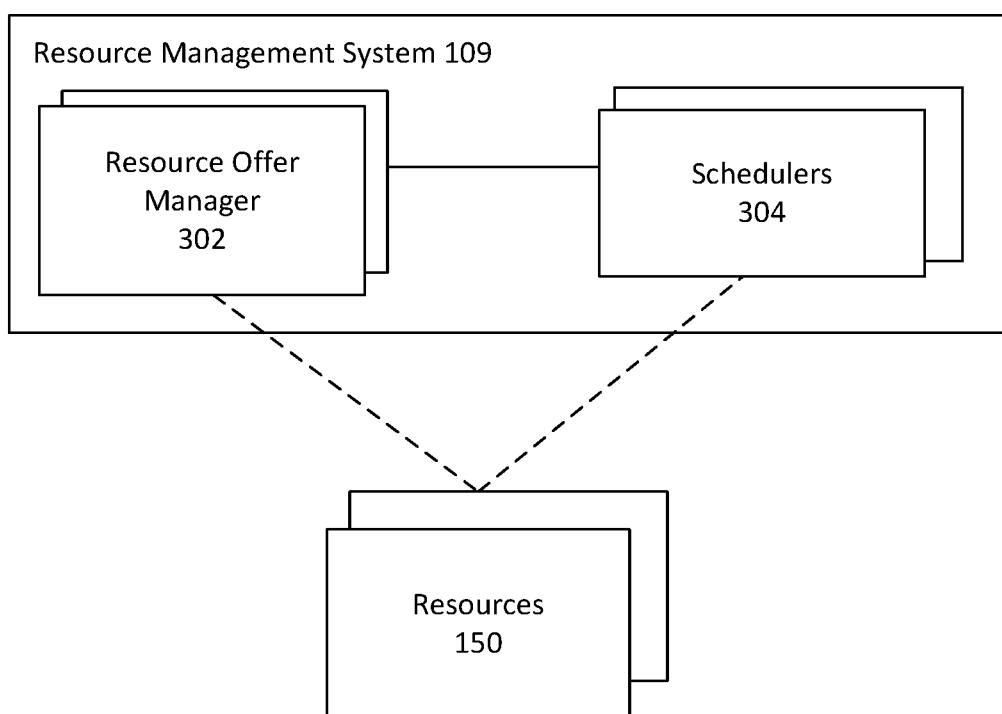
FIG. 3 is a block diagram of an example resource management system.

FIG. 3 is a block diagram of an example resource management system 109. The resource management system 109 includes one or more resource offer managers 302, and one or more schedulers 304. The resource offer managers 302 and schedulers 304 are communicatively coupled to resources 150. In some embodiments, resource offer managers 302 and schedulers 304 run independently from each other, possibly in separate geographic locations. Resources 150 can include resources from one or many resource servers 103. In some embodiments, resources 150 include resources from resource servers 103 and computing devices 102.

Resource management system 109 may be implemented by one or more processors 101 in one or more computing devices 102 or resource servers 103 in the distributed computing system 100. In some embodiments, the resource management system 109 is an infrastructure middleware which can run on top of a distributed computing environment. The distributed environment can include different kinds of hardware and software.

Resource management system 109 handles resource management, workload management, and scheduling. Workloads can refer to any process, job, service or any other computing task to be run on the distributed computing system 100. For example, workloads may include batch jobs (e.g., high performance computing (HPC) batch jobs), serial and/or parallel batch tasks, real time analytics, virtual machines, containers, and the like. There can be considerable variation in the characteristics of workloads. For example, workloads can be CPU-intensive, memory-intensive, batch jobs (short tasks requiring quick turnarounds), service jobs (long-running tasks), or real-time jobs.

Resource offer manager 302 offers and allocates resources 150 to schedulers 304. In some embodiments, a single resource offer manager 302 offers and allocates resources 150 for each scheduler 304. In other embodiments, the resource management system 109 includes more than one resource offer manager 302, and each of the resource offer managers 302 is responsible for allocating a particular subset of the resources 150 to the one or more schedulers 304. As an example, if there are multiple resource servers 103, there may be a separate resource offer manager 302 for allocating the resources 150 from each respective resource server 103 or server group.

Resource offer manager 302 operates in accordance with a resource acquisition cycle. The resource acquisition cycle is a temporal period during which resources 150 acquired by schedulers 304 remain unchanged. In some embodiments, acquired resources can be pre-empted for policy reasons and released. The resource acquisition cycle may have a duration of, for example, one minute or five minutes. After a resource acquisition cycle has elapsed, the resource offer manager 302 may alter the allocation of resources 150 to one or more of the schedulers 304.

In some embodiments with more than one resource offer manager 302, the resource offer managers 302 are synchronized and share a common resource acquisition cycle. Alternatively, different resource offer managers 302 can operate in accordance with distinct resource acquisition cycles. Although in the example embodiments described herein, the resource acquisition cycle is described in terms of temporal duration, the resource acquisition cycle may alternatively correspond to a period of computational cycles.

Schedulers 304 are operable to temporarily acquire resources 150 from resource offer manager 302 and then assign workloads to the acquired resources 150 for workload execution.

Scheduler 304 operates in accordance with a workload scheduling cycle. The workload scheduling cycle is a series of operations which are carried out by the scheduler 304 and then repeated. In some embodiments, the workload scheduling cycle for a particular scheduler is independent from the workload scheduling cycles for any other schedulers 304 and independent from the resource acquisition cycle of any other resource offer managers 302. The workload scheduling cycle is associated with a workload scheduling period. The workload scheduling period is a temporal period during which the workloads scheduled for execution by particular resources 150 remain unchanged. In some embodiments, the workload scheduling cycle can be driven by events which cause the workload scheduling cycle to end prematurely. In some embodiments, the workload scheduling period is fixed and defined by a set time interval, number of clock cycles, or the like. In other embodiments, the workload scheduling period is variable and is defined by the time the workload scheduling cycle takes to be performed. A scheduling period may be, for example, five seconds long. In some embodiments, each scheduler 304 in resource management system 109 has a workload scheduling cycle having a different scheduling period. In some embodiments, one or more schedulers 304 have synchronized workload scheduling cycles having a common scheduling period.

During scheduling, scheduler 304 determines whether any additional workloads require execution or whether any acquired resources have become available subsequent to completing a previously assigned workload. Scheduler 304 may then assign additional workloads to some or all available acquired resources 150.

Scheduler 304 may assign workloads to acquired resources in accordance with a scheduling policy. Various scheduling policies can be implemented to accomplish different performance goals. For example, scheduler 304 may aim to maximize throughput (the amount of work completed per unit time), minimize latency (the time required from a workload being created to the workload being completed), or maintain a certain level of fairness (e.g. allocate a certain amount of resources to different scheduled tasks, or computing devices).

In practice, these performance goals are often in conflict. For example, maximizing throughput entails scheduling workloads to use as many acquired resources as possible at any given time. However, minimizing latency for urgent workloads may involve leaving certain acquired resources unused by a scheduler, in order for those resources to be available when an urgent workload is received. Thus, attempting to implement a scheduling policy which both maximizes throughput and minimizes latency is difficult.

In some embodiments, the resource acquisition period is longer than the workload scheduling period. Thus, in some embodiments, the resources acquired and available to each scheduler 304 are constant for at least two consecutive workload scheduling cycles.

Schedulers 304 may be implemented in hardware, software, or a combination of hardware and software (e.g. a program executed by a processor 101). Scheduler 304 is operable to receive one or more workloads from one or more computing devices 102, and schedule workloads for execution by resources 150 acquired from the resource offer manager 302.

Figure 4:
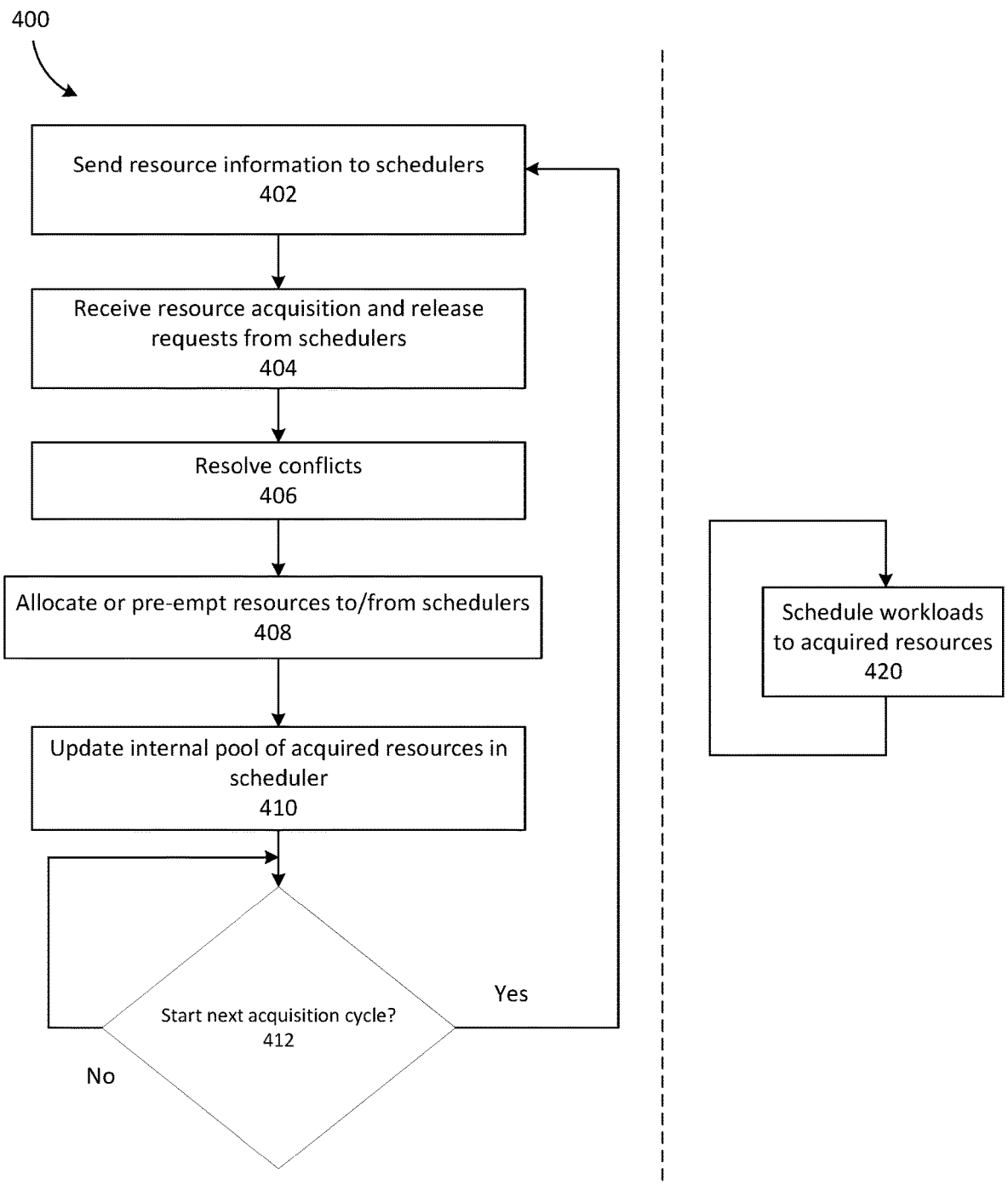
FIG. 4 is a flow diagram of an example method of scheduling workloads.

FIG. 4 is a flow diagram of a simplified example method 400 of scheduling workloads. In FIG. 4, each of the blocks is presented from the perspective of the resource offer manager 302, with the exception of block 420 (which is from the perspective of the scheduler 304). It should be appreciated that various blocks in method 400 are explained in further detail below in relation to FIGS. 5 and 6.

At 402, the current full-state resource information concerning resources is sent to one or more schedulers 304. In some embodiments, the sending of full-state resource information is based on subscriptions of schedulers 304. The full-state resource information is provided by the resource offer manager 302. The current full-state resource information includes one or more of listings of resources currently in use, resources currently not in use, as well as any sharing or ownership policies for the resources, or combinations and/or subsets thereof. In some embodiments, a scheduler 304 can subscribe to be offered resources of certain types, or resources which are not in use, which can reduce the likelihood of a conflict with other schedulers 304. In some embodiments, the schedulers 304 initially do not have any resources allocated thereto.

In some embodiments, the resource management system has a plurality of resource offer managers 302, each of which manages separate sets of resources 150. Optionally, the resource acquisition cycles may be synchronized among each resource offer manager 302. Alternatively, the resource offer managers 302 may have different (e.g. relatively shorter or longer) resource acquisition cycles.

At 404, each scheduler 304 sends resource acquisition and release requests to the resource offer manager 302. It should be appreciated that in embodiments in which more than one resource offer manager 302 is present, the scheduler 304 may send resource acquisition and release requests to more than one of the resource offer managers 302.

In some embodiments, the schedulers 304 determine whether to release or acquire resources based on a review of the full-state resource information and pending workloads, as well as any sharing or performance policies which are in effect, or any combination thereof. Each resource acquisition request includes the type and amount of each resource requested by a scheduler 304. Resource release requests indicate to the resource offer manager 302 that resources currently allocated to a particular scheduler 304 are no longer required by that scheduler 304 and can be released and possibly offered to other schedulers 304.

In some embodiments, the acquisition and release requests by a scheduler 304 are included in a single transmission to the resource offer manager 302. A scheduler 304 may request any of: a) maintaining the current set of resources allocated to the particular scheduler 304, b) acquiring additional resources to the particular scheduler 304, c) releasing one or more of the resources previously acquired by the particular scheduler 304, and d) any combination thereof.

In some embodiments, scheduler 304 requests a range of resources, rather than a particular amount. For example, scheduler 304 can request a minimum amount of a type of resource, as well as a maximum amount. The use of ranges provides additional flexibility when resources are allocated, relative to requests for a set amount of resources.

For example, a request from a scheduler for 500 MB of memory would be rejected by a prior system with only 400 MB of memory available for allocation. Thus, those resources would not be allocated to the scheduler 304, and the workload requiring these resources would remain with that scheduler 304 and be factored into the resource request in the next resource acquisition. However, a request for a minimum of 400 MB of memory and a maximum of 600 MB of memory from the same scheduler 304 could result in the 400 MB being allocated to that scheduler. This could allow some workloads to be scheduled onto acquired resources sooner, and therefore allow some workloads to be completed sooner relative to prior systems.

In some embodiments, the resources allocated to a scheduler can be obtained from any computing resource in any location within distributed computing system 100. For example, a request for 400 MB of memory from a scheduler 304 can be satisfied by acquiring 200 MB from one computing resource and 200 MB from a separate computing resource. Optionally, resource requests can specify that resources to be acquired satisfy requirements related to physical proximity, location, or the like.

For example, in some embodiments, scheduler 304 transmits multiple resource requests and an affinity or anti-affinity parameter. The affinity or anti-affinity parameter may be included as part of a resource request (e.g. in the form of a field), or can be sent separately by scheduler 304 and include an identifier for the requests to which the affinity or anti-affinity restrictions apply (e.g. index numbers identifying particular requests made by scheduler 304). Affinity refers to a requirement that resources provided to that scheduler satisfy certain locality relationships between each other. For example, a scheduler 304 can request 200 MB of memory and also request 20 CPUs. In some embodiments, the scheduler 304 specifies that the 200 MB of memory and the 20 CPUs be located on resources that are located on the same rack. Upon receiving the resource requests from scheduler 304, the resource offer manager 302 takes into account that resources assigned to that scheduler 304 would need to reside on the same rack.

Resource requests from scheduler 304 may also or instead include an anti-affinity parameter. Anti-affinity refers to a requirement that resources allocated to a scheduler are physically separate from one another. Anti-affinity may be useful in situations in which a scheduler 304 requires a degree of resiliency to power outages or other physical disasters. For example, by having resources located in physically distinct locations, a power outage could be less likely to affect all of the resources acquired by scheduler 304, and allow at least some workloads to continue to be executed. For example, a scheduler 304 can request two allocations of 300 MB of memory and 3 CPUs. In some embodiments, the scheduler 304 specifies that the two allocations which are assigned must be found on two nodes that are specifically not located on the same rack. The resource offer manager 302 would then take into account that resources assigned to that scheduler 304 would have to reside on two separate racks. Although the above examples relate to racks, affinity and anti-affinity can also refer to locations of data-centres, countries, geographic regions, or the like. For example, either of an affinity or anti-affinity parameter may be set to one of a plurality of possible values, each corresponding to a level of proximity or separation. An affinity parameter of 1 may indicate that resources must be assigned from the same rack; an affinity parameter of 2 may indicate that resources must be assigned from the same building or local-area network, and the like. An anti-affinity parameter value of 1 may indicate that resources cannot be located on the same rack; an anti-affinity parameter value of 2 may indicate that resources cannot be located in the same building or local area network.

At 406, the resource offer manager 302 receives each of the resource acquisition and release requests from the schedulers 304. The resource offer manager 302 resolves any conflicts which may arise between the requests from individual schedulers 304. In some embodiments, the resource offer manager 302 pre-empts resources from certain schedulers 304 and allocates the pre-empted resources to other schedulers 304 in accordance with resource sharing policies. For example, if a scheduler 304 requests to reclaim some resources that are owned by that scheduler 304 and currently in use by another scheduler, the resource offer manager 302 can initiate a pre-emption action for the scheduler 304. The resource offer manager 302 ultimately determines an allocation of resources for each of the schedulers 304. The resource offer manager 302 may take into account any sharing policies or performance policies in effect when determining the allocation for each scheduler 304.

At 408, the resource offer manager 302 transmits the resource allocation information to each of the schedulers 304. The resource allocation information includes the type and amount of each resource that will be acquired by a particular scheduler. The resource allocation information may also include information concerning the resource server 103 or computing device 102 on which each resource to be acquired is located. In some embodiments, one or more resources previously acquired by a scheduler 304 are released to the resource offer manager 302 for possible allocation to other schedulers 304.

At 410, schedulers 304 update internal records to reflect the latest resource allocation. In some embodiments, scheduler 304 updates an internal pool of acquired resources in an acquisition thread executing within scheduler 304. After updating the internal pool of acquired resources, each scheduler 304 can then schedule workloads for execution on the acquired resources. As shown at 420, the scheduling and execution of workloads on the acquired resources occurs in parallel with the resource acquisition cycle and continues for the remainder of the resource acquisition period of the resource offer manager 302, or for the duration of scheduling and execution of workloads, unless pre-empted by resource offer manager 302, as described below in relation to FIG. 6. In some embodiments, the scheduler 304 includes a scheduling thread which handles scheduling and execution of workloads. The scheduling thread executes in parallel with the acquisition thread in scheduler 304. Scheduler 304 operates in accordance with a workload scheduling cycle. After a workload scheduling cycle has completed, the scheduler 304 may assign more workloads to the acquired resources, as shown at 420.

At 412, it is determined whether to start the next resource acquisition cycle. If not, the method 400 waits and returns to 412. In the meantime, schedulers 304 schedule more workloads for execution on the acquired resources at 420. If it is determined that the next resource acquisition cycle will start, then the method returns to 402, where full-state resource information is sent to each of the one or more schedulers 304 by resource offer manager 302. The determination as to whether to start the next resource acquisition cycle may be made on the basis of, for example, the time elapsed since the previous resource acquisition cycle was carried out.

Figure 5:
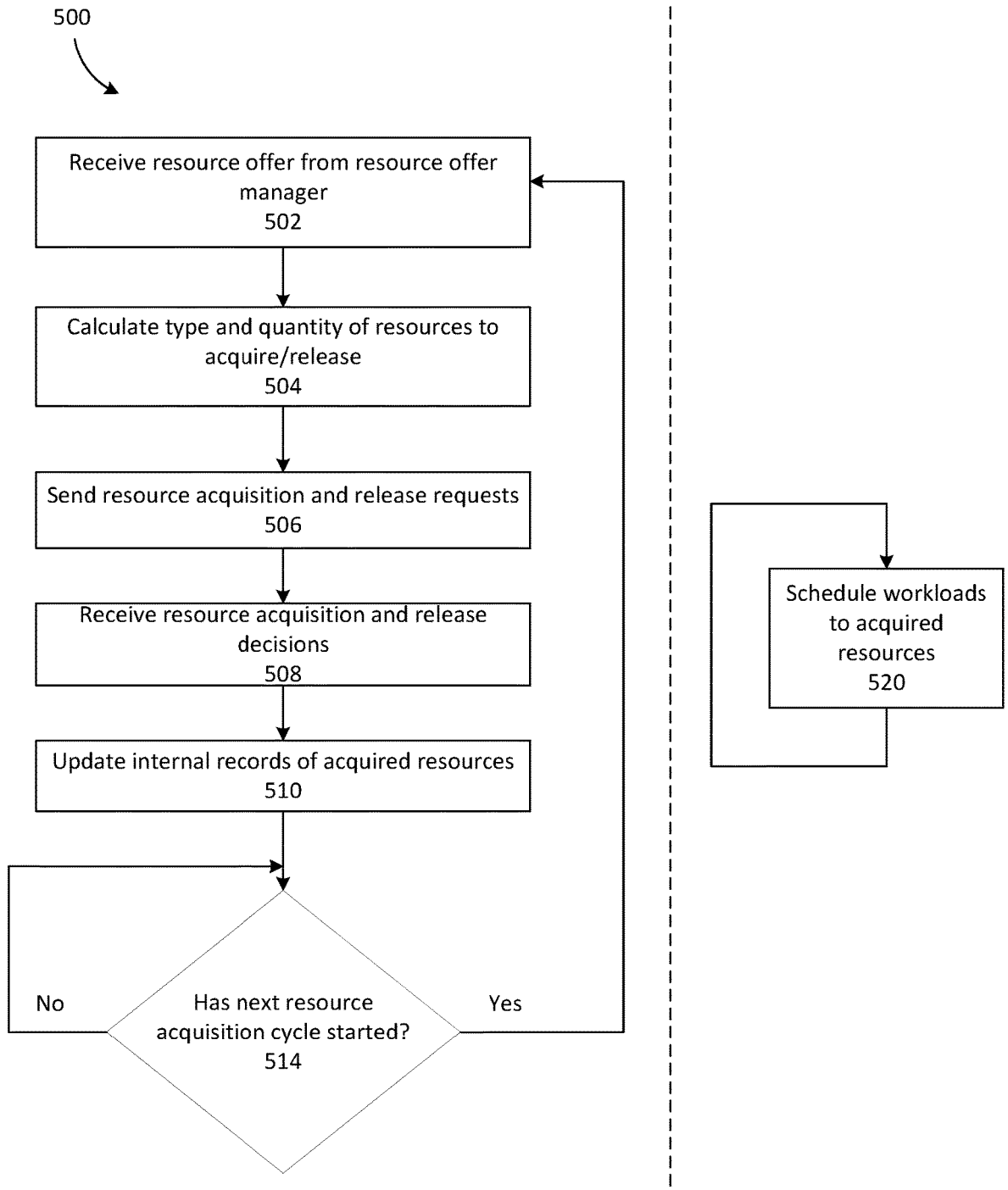
FIG. 5 is a flow chart showing an example method of allocating resources to a scheduler and scheduling workloads for execution by computing resources, from the perspective of a scheduler.

FIG. 5 is a flow chart showing an example method 500 of allocating resources to a scheduler and for scheduling workloads for execution by computing resources, from the perspective of the acquisition thread in the scheduler 304. At 502, at the beginning of a resource acquisition cycle, the scheduler 304 receives a resource offer from the resource offer manager 302. The resource offer contains full-state information for all of the resources 150 managed by the resource offer manager 302.

It should be noted that in embodiments which contain more than one resource offer manager 302, the scheduler 304 receives a resource offer from each resource offer manager 302. Each resource offer manager 302 does not necessarily have the same resource acquisition cycle. Moreover, each resource offer manager 302 is not necessarily synchronized with the other resource offer managers 302. As such, a scheduler 304 may receive different resource offers from different resource offer managers 302 at different times.

In some embodiments, two or more of the resource offer managers 302 are synchronized and share the same resource acquisition cycle. In those embodiments, a scheduler 304 would receive resource offers from the synchronized resource offer managers 302 at similar times, thus providing the scheduler with a fuller picture of the resources 150 available from the synchronized resource offer managers 302.

At 504, the acquisition thread in scheduler 304 evaluates the full-state resource information received in the resource offers and determines the type and amount of each resource the scheduler 304 should acquire. In some embodiments, the scheduler 304 makes this determination by evaluating the workloads currently pending. The scheduler 304 may also make this determination taking into account a "dry-run" (i.e. a test run) of the workload-to-resource scheduling policies in place. The scheduler 304 may also estimate the resources required in the next resource acquisition cycle.

At 506, once the acquisition thread in scheduler 304 determines the type and amount of resources to be acquired and/or released, the scheduler 304 sends a resource acquisition request to the resource offer manager 302. The resource acquisition request can include one or more of a range (e.g. minimum and maximum amounts of a type of resource) of resources to be acquired, as well as affinity or anti-affinity restrictions for the resources (e.g. requiring the resources to be located in the same geographic location, or located in separate geographic locations). This provides additional flexibility for the resource offer manager 302 to satisfy the requests of potentially many different schedulers 304.

The resource acquisition request may include resource release requests. The scheduler 304 may request the release of a previously acquired resource when the scheduler 304 determines that more resources are currently acquired than are necessary to meet the scheduler's scheduling and performance policies. In embodiments in which there is one resource offer manager 302, the scheduler 304 sends resource release requests to the resource offer manager 302. In embodiments in which include more than one resource offer manager 302, the scheduler 304 may send a resource release request to one or more of the resource offer managers 302.

In some embodiments, the scheduler 304 may send a resource release request at any point in time, including prior to the commencement of the next resource acquisition cycle. This allows unused resources to be released earlier, and thus allows for more efficient use of resources.

In some embodiments, the resource offer manager 302 is configured to pre-empt one or more resources which have been acquired by a scheduler 304. That is, rather than the scheduler 304 voluntarily sending a resource release request to resource offer manager 302, the resource offer manager 302 is operable to forcibly release a resource that has been acquired by a scheduler 304. In some embodiments, resource offer manager 302 can initiate a resource pre-emption at any point in time, irrespective of whether a resource acquisition cycle is underway.

At 508, the scheduler 304 receives resource acquisition and release decisions from the resource offer manager 302. In some embodiments, the resource offer manager 302 resolves conflicts prior to sending the resource acquisition and release decisions to the scheduler 304. In embodiments in which there are multiple resource offer managers 302, the scheduler 304 receives resource acquisition and release results from each resource offer manager 302, though the results are not necessarily delivered at the same time by each resource offer manager 302.

At 510, upon receiving the acquisition and release decisions, the scheduler 304 updates its internal pool of acquired resources based on the acquisition and release decisions. In some embodiments, the acquisition and release decisions might not result in the acquisition or release of any resources for a scheduler 304. From this point until the next time resource acquisition and release decisions are received from the resource offer manager 302, the resources acquired by this scheduler 304 may remain static. However, as noted above, the resource offer manager 302 may initiate pre-emption of a resource at any point, should the need arise.

At 520, the scheduling thread in the scheduler 304 schedules workloads for execution on the acquired resources 150 for the duration of the workload scheduling cycle of the scheduler 304. In some embodiments, the scheduling thread in scheduler 304 executes in parallel to the acquisition thread in scheduler 304. The scheduler 304 may schedule workloads to resources in accordance with various scheduling algorithms and policies.

For example, a scheduler may implement a policy in which as many resources as possible are used at any given time. The scheduling and execution of workloads with acquired resources continues until the resource acquisition period has elapsed. At 514, if the next resource acquisition cycle has not started, the method 500 waits and loops back to 514. In the meantime, the scheduling thread in the scheduler 304 continues to schedule further workloads at 520. At 514, when the next resource acquisition cycle has started, the method 500 returns to 502, where a resource offer is received from the resource offer manager 302.

Figure 6A:
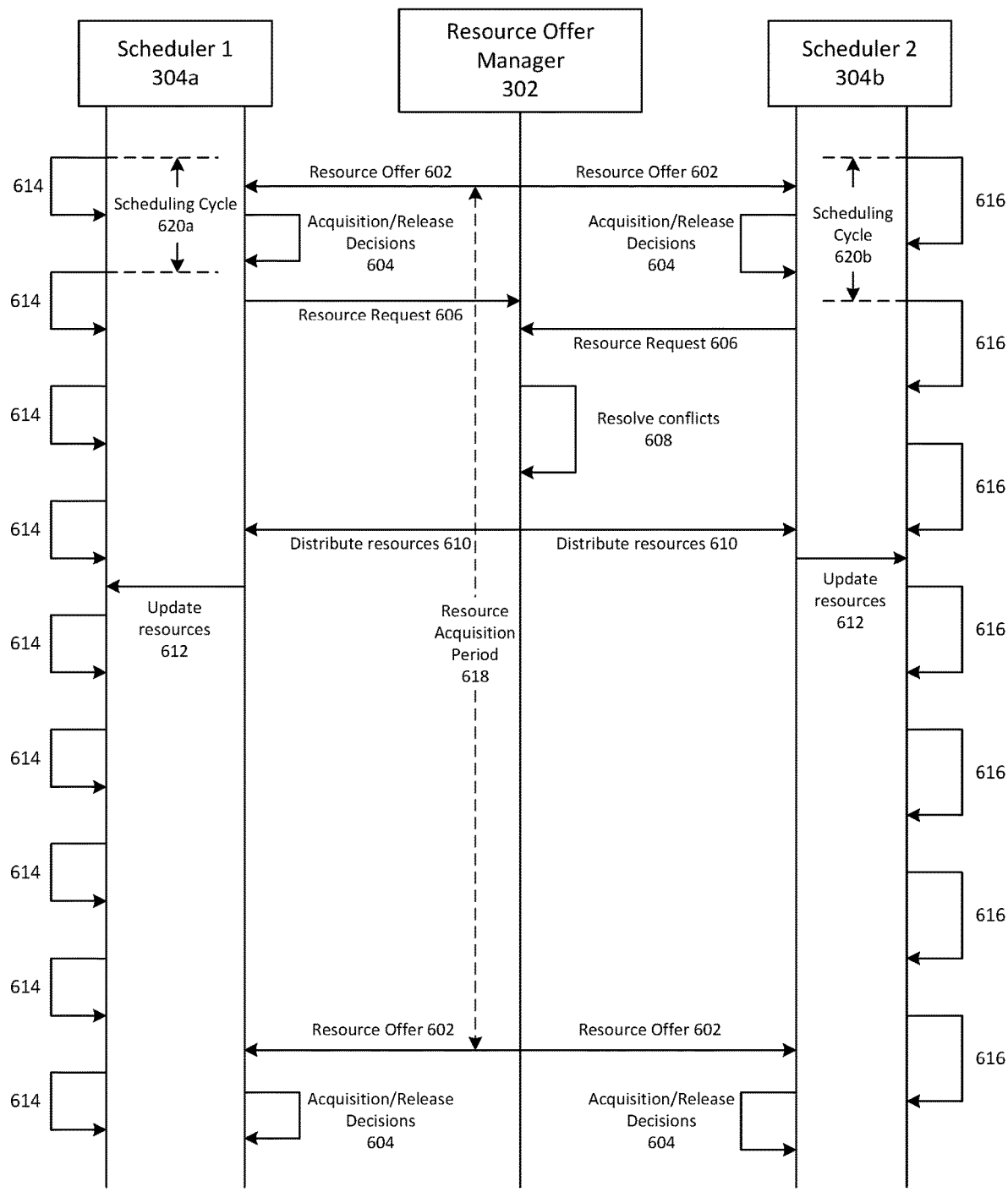
FIG. 6A is a sequence diagram of an example resource management system showing both the resource acquisition cycle and workload scheduling cycles operating in parallel.

FIG. 6A is a sequence diagram of an example resource management system 109 in operation, showing both the resource acquisition cycle and workload scheduling cycles operating in parallel. Each scheduler 304*a* and 304*b* includes a scheduling thread and a resource acquisition thread. A resource acquisition cycle begins with the resource offer manager 302 sending a resource offer 602 to each of schedulers 304*a* and 304*b*. The resource offer includes full-state information for all resources managed by the resource offer manager 302. The full-state information may include, for example, one or more of a listing of resources that are not currently in use, a listing of resources that are currently in use, and resource ownership and sharing plans in effect for one or more schedulers 304. In some embodiments, a scheduler 304 may be subscribed only to receive resource information relating to resources which are owned by the scheduler 304, resources of a particular type or types, or resources which are not in use in order to reduce the likelihood of a conflict with other schedulers. In some embodiments, prior to the commencement of the first resource acquisition cycle at 602, none of the resources 150 are assigned to any of the schedulers 304.

Upon receiving the full-state information, at 604, each scheduler 304 analyzes the full-state resource information. Each scheduler 304 determines the types and quantities of resources to be acquired. In some embodiments, the scheduler 304 makes this determination based on the workloads currently assigned to the scheduler 304. The estimation may also be based on any scheduling policy algorithms in effect. For example, scheduler 304 may dry-run its workload-to-resource scheduling policy algorithms in order to estimate the resources required.

It should be appreciated that in the embodiments described herein, the resources acquired by a scheduler 150 may be associated with more than one resource server 103. For example, the resources 150 may be provided by a plurality of resource servers 103 and/or computing devices 102 in a distributed network. Although each resource is located in a particular resource server 103, the scheduler 304 can request resources without having to specify a particular resource server 103 from which to obtain the resources. In some embodiments, the scheduler 304 can specify which resource servers 103 or which types of resource servers 103 the resources should come from.

Once the amount and type of resources to be acquired have been determined by schedulers 304, each scheduler 304 creates and sends a resource acquisition request at 606. For each scheduler 304, the resource acquisition request contains the quantity and type of resources to be acquired by that particular scheduler 304. In some embodiments, the quantity of one or more types of resources is specified as a range in the resource acquisition request (e.g. a minimum quantity and a maximum quantity of a type of resource). The use of ranges in the resource acquisition requests may allow for greater flexibility for the resource offer manager 302 when resources are ultimately allocated to each scheduler 304. In some embodiments, the resource acquisition requests contain affinity or anti-affinity restrictions. The use of affinity or anti-affinity parameters in or with the resource acquisition requests may allow the scheduler 304 to satisfy the needs of workloads assigned to the scheduler 304. The resource acquisition request may also include instructions to release a previously acquired resource, as described above.

At 608, the resource offer manager 302 determines the type and amount of resources 150 that will be acquired by each scheduler 304 based on the received resource acquisition requests. In some embodiments, the resource offer manager 302 determines the amount of resources to allocate to each scheduler 304 based at least in part on resource ownership and sharing plans. The process of determining what resources to offer to which schedulers is referred to herein as resource acquisition conflict resolution, and is heavily influenced by the policies of the resource offer manager 302.

In some embodiments, there may be insufficient resources 150 available to handle all workloads. In such situations, the resource offer manager 302 allocates resources to schedulers 304 based on resource sharing policies (e.g. fairness) and priorities between the schedulers.

Once resource acquisition conflicts have been resolved at 608 by the resource offer manager 302, the resource offer manager 302 then sends resource allocations to each of the schedulers 304 at 610. That is, each scheduler 304 receives instructions from resource offer manager 302 which specify the resources that have been assigned to that scheduler 304. At 612, each scheduler 304 updates the resources 150 allocated to that scheduler 304. As depicted, the resources 150 allocated to that scheduler 304 will remain allocated to that scheduler 304 for the remainder of the resource acquisition cycle 618 after performance of 612, and a portion of the subsequent resource acquisition cycle, until the acquired resources are updated at 612 of that subsequent resource acquisition cycle.

After the resource acquisition cycle 618 has completed (for example, after a certain period of time has elapsed), the process repeats when the resource offer manager 302 sends a subsequent resource offer 602 to each scheduler 304 with full-state information for all resources managed by resource offer manager 302. The subsequent resource acquisition cycle continues at 604, where schedulers determine the types and quantities of resources to be acquired. In some embodiments, there are multiple resource offer managers 302 which manage distinct sets of resources 150. In embodiments which include only one resource offer manager 302, the resource offer manager 302 manages all of the available resources 150.

It should be noted that when the subsequent resource offer 602 is sent to each scheduler 304 (thus beginning the subsequent resource acquisition cycle), the resources 150 that were acquired by each scheduler 304*a* and 304*b* in the previous resource acquisition cycle remain unchanged. Thus, while the schedulers 304*a*, 304*b* and the resource offer manager 302 exchange various information and make the determinations as to required resources and conflict resolution for a next resource acquisition cycle, the resources 150 from the previous resource acquisition cycle remain assigned to each scheduler 304a, 304b.

Accordingly, the scheduling threads on schedulers 304a and 304b can continue to schedule workloads 614 and 616, respectively, to their acquired resources 150 for execution in parallel with the resource acquisition thread. Thus, the resolution of resource acquisition conflicts by the resource offer manager 302 does not impede any of the schedulers 304a, 304b from scheduling and executing workloads. This may be particularly beneficial in larger scale computing environments, in which resource acquisition conflicts may require sophisticated conflict resolution algorithms which would otherwise act as a bottleneck for the system.

It should be noted that the resource acquisition period 618 of resource offer manager 302 may be longer in duration than the workload scheduling cycles 620a, 620b of schedulers 304a, 304b. In some embodiments, the resource acquisition cycle 618 can be significantly longer than the workload scheduling cycles 620a, 620b. As such, many workload scheduling cycles 620a, 620b can be performed by a scheduler 304a, 304b within one resource acquisition period 618. This allows the resources acquired by each scheduler 304a, 304b to remain static across multiple workload scheduling cycles 620a, 620b. When the pool of resources assigned to a scheduler 304 remains constant across 2 or more workload scheduling cycles, the scheduler 304 also has greater flexibility to maintain any scheduling policies. For example, the scheduler 304 can better maintain fairness (which may be an important scheduling policy) when the pool of resources assigned to the scheduler is constant over a time period.

For example, when the scheduler 304a is aware that the acquired resources will remain constant for 4 workload scheduling cycles, the scheduler 304a can schedule workloads in a more flexible manner than in cases where there are no resource acquisition cycles, and therefore the pool of resources available to a scheduler can change between each workload scheduling cycle.

As a concrete example, if the scheduling policy for a scheduler requires that 50% of processing power be used for a first user's tasks, and 50% should be used for a second user's tasks, the scheduler 304a can have many possible ways to schedule and adjust the fairness between the first and second users over multiple workload scheduling cycles. For example, the scheduler 304a can allocate 50% of resources to the first user and 50% of resources to the second user. The scheduler 304a could also allocate 100% of processing power to complete the first user's tasks for two cycles, and then assign 100% of processing power to the second user's tasks in the subsequent two cycles. In this example, if the second user's tasks require longer than two cycles to complete, the scheduler 304a can subsequently change the allocation of resources to compensate and maintain fairness. This scheme would maintain the scheduling policy at the scheduler level. In previous systems in which schedulers do not have stable resource allocations across multiple workload scheduling cycles 620a, such a scheme may not be desirable, because the allocated resources might subsequently change. Thus, some embodiments of the systems and methods described herein allow computing systems to function more efficiently.

It should also be noted that according to some embodiments, a resource offer manager 302 receives resource acquisition and/or release requests from each scheduler 304a, 304b at the same time. Thus, the resource offer manager 302 obtains a full picture of all the resource acquisition requests from the schedulers 304. Having full information regarding the resource requests of each scheduler 304 allows the resource offer manager 302 to resolve resource acquisition conflicts while maintaining the resource sharing policies among multiple schedulers 304 in distributed computing system 100. Moreover, the resource acquisition conflict resolution process is carried out holistically by the resource offer manager 302 and there is less reason for a scheduler 304 to hoard resources. That is, rather than the resource offer manager 302 considering the demands of one scheduler 304 at a time (which can result in resources being used up and unavailable for later resource requests from other schedulers 304), the resource offer manager 302 is able to consider the demands of groups of schedulers 304 when resolving conflicts, while maintaining resource sharing policies at the resource offer manager level.

It should further be noted that in some embodiments, the resource acquisition cycle and the workload scheduling cycles are decoupled and execute in parallel. Thus, the schedulers 304 continue to schedule and execute workloads on acquired resources while the resource offer manager 302 works in parallel to resolve conflicts between resource acquisition requests from different schedulers 304. The resolution of conflicts can potentially be a complex and time-consuming process as computing systems and workloads grow larger. The decoupling of the resource acquisition cycle from the workload scheduling cycle can prevent or at least reduce the chance of the resource offer manager 302 being the bottleneck in a computing system, because the schedulers 304 continue the scheduling and execution of workloads while the resource offer manager 302 resolves resource acquisition conflicts.

Figure 6B:
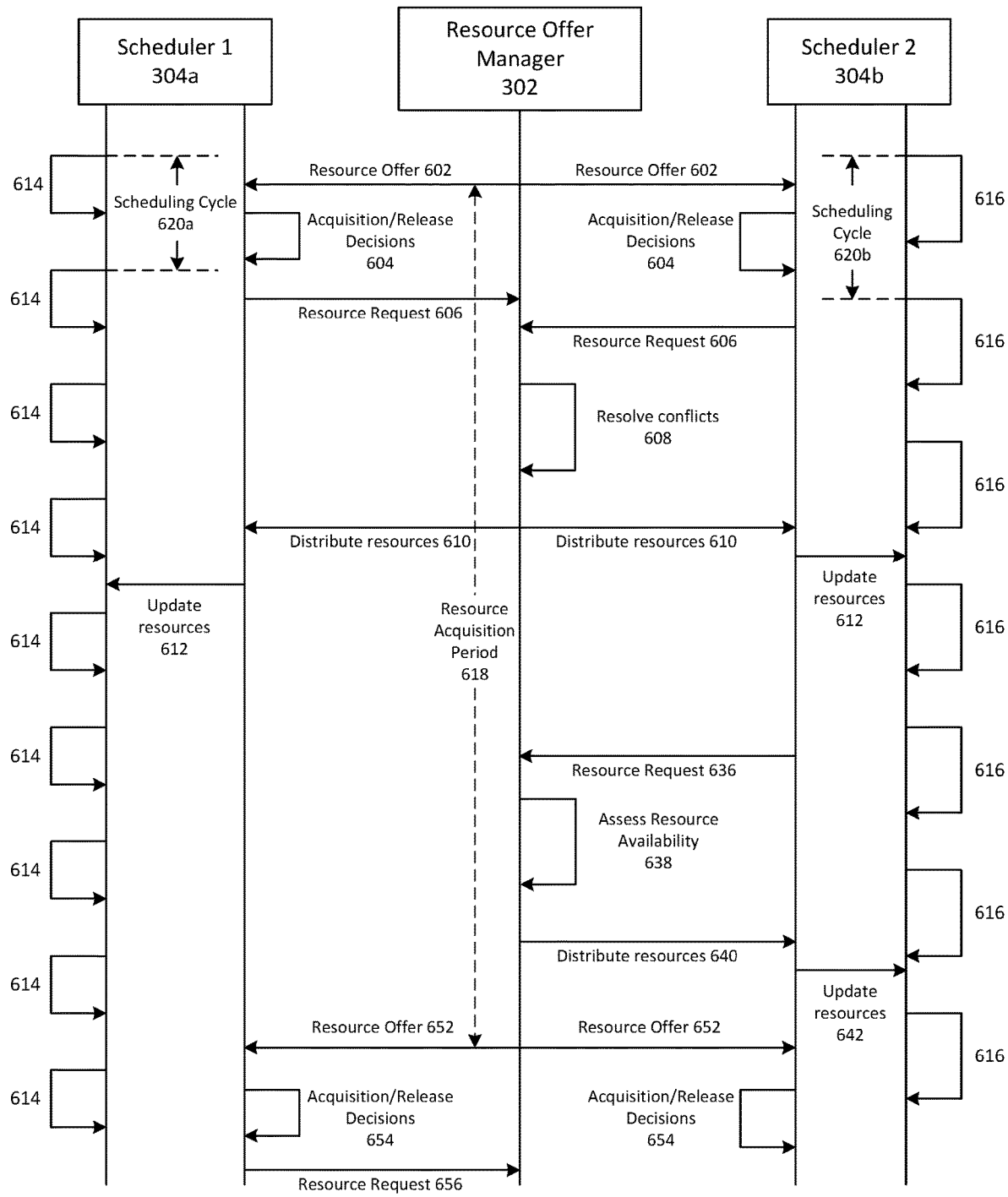
FIG. 6B is a sequence diagram of an example resource management system in operation.

FIG. 6B is a sequence diagram of an example resource management system 109 in operation, showing both the resource acquisition cycle and workload scheduling cycles operating in parallel. In some embodiments, schedulers 304 send resource requests independently of the stage in the resource acquisition cycle. That is, a scheduler 304 does not need to have received a resource offer from the resource offer manager 302 in order to send a resource acquisition or release request.

For example, as depicted in FIG. 6B, a scheduler 304b may receive an unexpected surge in the quantity of workloads for execution and may send a resource request 636 to resource offer manager 302 prior to the beginning of the next resource acquisition cycle at 652. Upon receiving the resource request 636, the resource offer manager 302 assesses the availability of resources at 638. At 640, the resource offer manager distributes additional resources to scheduler 304b. At 642, the scheduler 304b updates its internal records to reflect the additional acquired resources. In some embodiments, the resource offer manager 302 determines at 638 that insufficient resources are available for allocation to scheduler 304b, and pre-empts one or more resources from a different scheduler 304a and allocates the pre-empted resources to scheduler 304b.

In some embodiments, the resource offer manager 302 does not take immediate action upon receiving resource request 636. Instead, the resource offer manager 302 waits until the beginning of the next resource acquisition cycle at 652 and determines the resource allocation for each scheduler taking into account the resource request 636 previously received from scheduler 304b. In some embodiments, if scheduler 304b has already sent a resource request 636 to the resource offer manager 302 prior to the commencement of the next resource acquisition cycle at 652, the scheduler 304b might not send a resource request 606 in response to the resource offer 602. For example, if the scheduler 304b's resource requirements have not changed subsequent to sending the resource request 636, scheduler 304b may opt not to send an additional resource request in response to the resource offer 652.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufactures, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufactures, compositions of matter, means, methods, or steps.

As can be understood, the detailed embodiments described above and illustrated are intended to be examples only. Variations, alternative configurations, alternative components and modifications may be made to these example embodiments. The invention is defined by the claims.

What is claimed is:

1. A method of two-level scheduling of computing resources and workloads in a distributed computing system, the method comprising:
   periodically performing a first resource acquisition cycle associated with a first resource offer manager configured to manage a pool of computing resources of the distributed computing system to be shared and acquired by a plurality of workload schedulers, the pool of computing resources comprising a subset of the computing resources in the distributed computing system, the first resource acquisition cycle comprising:
   transmitting, by the first resource offer manager, a first resource offer specifying a state of each computing resource in the pool to each workload scheduler of the plurality of workload schedulers;
   receiving a first resource acquisition request from each workload scheduler of the plurality of workload schedulers, the first resource acquisition request received from each respective workload scheduler including computing resources in the pool of computing resources to be acquired by the respective workload scheduler based on the state of each computing resource in the pool of computing resources;
   computing, by the first resource offer manager, a resource allocation for each workload scheduler based on the first resource acquisition request received from each workload scheduler after resolving conflicts among the plurality of workload schedulers; and
   assigning computing resources in the pool of computing resources to each respective workload scheduler of the plurality of workload schedulers according to the resource allocation for the respective workload scheduler; and
   performing a first workload scheduling cycle to schedule, by each respective workload scheduler, workloads associated with the scheduler for execution using the computing resources assigned to the respective workload scheduler.

2. The method of claim 1 further comprising performing a second workload scheduling cycle during performance of the first resource acquisition cycle.

3. The method of claim 1, further comprising:
   periodically performing a second resource acquisition cycle associated with a second resource offer manager configured to manage a second pool of computing resources of the distributed computing system to be shared and acquired by a second plurality of workload schedulers, the second pool of computing resources comprising a second subset of the computing resources in the distributed computing system, the second resource acquisition cycle comprising:
   transmitting, by the second resource offer manager, a second resource offer specifying a state of each computing resource in the second pool to each of the second plurality of workload schedulers, the computing resources in the second pool being distinct from the computing resources in the pool;
   receiving a second resource acquisition request from each workload scheduler of the second plurality of workload schedulers, the second resource acquisition request received from each respective workload scheduler of the second plurality of workload schedulers including computing resources in the second pool of computing resources to be acquired by the respective workload scheduler of the second plurality of workload schedulers based on the state of each computing resource in the second pool of computing resources;
   computing, by the second resource offer manager, a resource allocation for each workload scheduler of the second plurality of workload schedulers based on the second resource acquisition request received from each workload scheduler of the second plurality of workload schedulers after resolving conflicts among the second plurality of workload schedulers; and
   assigning resources from the second pool of computing resources to each respective workload scheduler of the second plurality of workload schedulers according to the resource allocation for the respective workload scheduler of the second plurality of workload schedulers.

4. The method of claim 3, wherein the first resource acquisition cycle is independent of the second resource acquisition cycle and the pool of computing resources managed by the first resource offer manager includes different computing resources of the distributed computing system than the second pool of computing resources managed by the second resource offer managers.

5. The method of claim 1, wherein the first acquisition resource request comprises a request to acquire a quantity of computing resources from the pool of computing resources, the quantity of computing resources being specified as a range.

6. The method of claim 1, wherein the first resource acquisition request specifies a required affinity.

7. The method of claim 1, wherein the first resource acquisition request specifies a required anti-affinity.

8. The method of claim 1, wherein the state of each computing resource in the pool includes at least one of an identification of computing resources currently in use among the computing resources in the pool, an identification of computing resources currently free for use among the computing resources in the pool, an ownership status associated with a particular computing resource in the pool, and resource sharing policies between at least two of the workload schedulers.

9. The method of claim 1, wherein the first resource offer is based on one or more subscriptions associated with one of the workload schedulers.

10. The method of claim 1, further comprising:
   receiving a supplementary resource request from one of the workload schedulers; and assigning additional computing resources from the pool of computing resources to the one of the workload schedulers based on the supplementary resource request.

11. The method of claim 10, wherein assigning the additional computing resources from the pool of computing resources comprises:
    releasing, from another workload scheduler other than the workload scheduler sending the supplementary resource request, at least one previously acquired computing resource to the pool of computing resources based on the supplementary resource request; and
    assigning the released at least one previously acquired computing resource to the workload scheduler sending the supplementary resource request.

12. The method of claim 1, further comprising:
    performing the first workload scheduling cycle by one of the workload schedulers to schedule a first workload associated with a workload scheduler for execution using computing resources allocated to the workload scheduler in parallel with and independently of other workload schedulers.

13. The method of claim 1, further comprising:
    pre-empting assigning of computing resources in the pool from at least one of the workload schedulers and allocating the pre-empted computing resources to at least one other workload scheduler based on at least one resource sharing policy.

14. A system comprising:
    at least one processor;
    a memory containing computer-readable instructions that, when executed by said at least one processor, cause the at least one processor to perform a method of two-level scheduling of computing resources and workloads in a distributed computing system comprising:
    periodically performing a first resource acquisition cycle associated with a first resource offer manager configured to manage a pool of computing resources of the distributed computing system to be shared and acquired by a plurality of workload schedulers, the pool of computing resources comprising a subset of the computing resources in the distributed computing system, the first resource acquisition cycle comprising:
    transmitting, by the first resource offer manager, a first resource offer to each workload scheduler of the plurality of workload schedulers;
    receiving a first resource acquisition request from each workload scheduler of the plurality of workload schedulers, the first resource acquisition request received from each respective workload scheduler including computing resources in the pool of computing resources to be acquired by the respective workload scheduler based on a state of each computing resource in the pool of computing resources;
    computing, by the first resource offer manager, a resource allocation for each workload scheduler based on the first resource acquisition request received from each workload scheduler after resolving conflicts among the plurality of workload schedulers; and
    assigning computing resources in the pool of computing resources to each respective workload scheduler of the plurality of workload schedulers according to the resource allocation for the respective workload scheduler; and
    performing a first workload scheduling cycle to schedule, by each respective workload scheduler, workloads associated with the scheduler for execution using the computing resources assigned to the respective workload scheduler.

15. The system of claim 14, wherein the method further comprises performing a second workload scheduling cycle during performance of the first resource acquisition cycle.

16. The system of claim 14, wherein the method further comprises:
    periodically performing a second resource acquisition cycle associated with a second resource offer manager configured to manage a second pool of computing resources of a distributed computing system to be shared and acquired by a second plurality of workload schedulers, the second pool of computing resources comprising a second subset of the computing resources in the distributed computing system, the second resource acquisition cycle comprising:
    transmitting, by the second resource offer manager, a second resource offer specifying a state of each computing resource in the second pool to each of the second plurality of workload schedulers;
    receiving a second resource acquisition request from each workload scheduler of the second plurality of workload schedulers, the second resource acquisition request received from each respective workload scheduler of the second plurality of workload schedulers including computing resources in the second pool of computing resources to be acquired by the respective workload scheduler of the second plurality of workload schedulers based on the state of each computing resource in the second pool of computing resources;
    computing, by the second resource offer manager, a resource allocation for each workload scheduler of the second plurality of workload schedulers based on the second resource acquisition request received from each workload scheduler of the second plurality of workload schedulers after resolving conflicts among the second plurality of workload schedulers; and
    assigning computing resources in the second pool of computing resources to each respective workload scheduler of the second plurality of workload schedulers according to the resource allocation for the respective workload scheduler of the second plurality of workload schedulers.

17. The system of claim 16, wherein the first resource acquisition cycle is independent of the second resource acquisition cycle and the pool of computing resources managed by the first resource offer manager includes different computing resources of the distributed computing system than the second pool of computing resources managed by the second resource offer manager.

18. The system of claim 14, wherein the first resource acquisition request comprises a request to acquire a quantity of resources from the pool of computing resources, the quantity of resources being specified as a range.

19. The system of claim 14, wherein the first resource acquisition request specifies a required affinity.

20. The system of claim 14, wherein the first resource acquisition request specifies a required anti-affinity.

21. The system of claim 14, wherein the state of each computing resource in the pool of computing resources includes at least one of an identification of computing resources currently in use among the pool of computing resources, an identification of computing resources currently free for use among the pool of computing resources, an ownership status associated with a particular resource in the pool of computing resources, and resource sharing policies between at least two of the workload schedulers.

22. The system of claim 14, wherein the first resource offer is based on one or more subscriptions associated with one of the workload schedulers.

23. The system of claim 22, wherein the method further comprises:
    receiving a supplementary resource request from one of the workload schedulers; and
    assigning additional computing resources from the pool of computing resources to the one of the workload schedulers based on the supplementary resource request.

24. A non-transitory computer-readable storage medium having stored thereon computer-executable instructions that, when executed by one or more processors, cause the one or more processors to perform a method of two-level scheduling of computing resources and workloads in a distributed computing system, the method comprising:
    periodically performing a first resource acquisition cycle associated with a first resource offer manager configured to manage a pool of computing resources of the distributed computing system to be shared and acquired by a plurality of workload schedulers, the pool of computing resources comprising a subset of the computing resources in the distributed computing system, the first resource acquisition cycle comprising:
    transmitting, by the first resource offer manager, a resource offer specifying a state of each computing resource in the pool of computing resources to each workload scheduler of the plurality of workload schedulers;
    receiving a resource acquisition request from each workload scheduler of the plurality of workload schedulers, the resource acquisition request received from each respective workload scheduler including computing resources in the pool of computing resources to be acquired by the respective workload scheduler based on the state of each computing resource in the pool of computing resources;
    computing, by the first resource offer manager, a resource allocation for each workload scheduler based on the resource acquisition request received from each workload scheduler after resolving conflicts among the plurality of workload schedulers and
    assigning a first plurality of computing resources from the pool of computing resources to each respective workload scheduler of the plurality of workload schedulers according to the resource allocation for the respective workload scheduler; and
    performing a first workload scheduling cycle to schedule, by each respective workload scheduler, workloads associated with the scheduler for execution using the first plurality of computing resources assigned to the respective workload scheduler.

25. The system of claim 23, wherein assigning the additional computing resources from the first plurality of computing resources comprises:
    releasing, from another scheduler other than the scheduler sending the supplementary resource request, at least one previously acquired resource to the first plurality of computing resources based on the supplementary resource request; and
    assigning the released at least one previously acquired resource to the scheduler sending the supplementary resource request.

* * * * *